US00RE48554E

(19) United States
(12) Reissued Patent
Guglielmi et al.

(10) Patent Number: US RE48,554 E
(45) Date of Reissued Patent: May 18, 2021

(54) AIR GUN SYSTEM AND METHOD

(71) Applicants: Paul Mark Guglielmi, Hilton, NY (US); Diana C. Petranek, Hilton, NY (US)

(72) Inventors: Paul Mark Guglielmi, Hilton, NY (US); Diana C. Petranek, Hilton, NY (US)

(21) Appl. No.: 16/352,008

(22) Filed: Mar. 13, 2019

Related U.S. Patent Documents

Reissue of:
(64) Patent No.: 9,591,956
Issued: Mar. 14, 2017
Appl. No.: 13/737,146
Filed: Jan. 9, 2013

(51) Int. Cl.
*A47L 9/08* (2006.01)
*A47L 5/14* (2006.01)
*B08B 5/02* (2006.01)
*B08B 15/04* (2006.01)

(52) U.S. Cl.
CPC ..... *A47L 9/08* (2013.01); *A47L 5/14* (2013.01); *B08B 5/02* (2013.01); *B08B 15/04* (2013.01)

(58) Field of Classification Search
CPC ..... A47L 5/14; A47L 9/08; A47L 5/24; B08B 15/04; B08B 5/02; B24C 9/00
See application file for complete search history.

(56) References Cited

U.S. PATENT DOCUMENTS 2,421,806 A 6/1947 Perry
3,322,351 A * 5/1967 Hackel ..... B01J 2/006 137/492.5
3,328,827 A 7/1967 Lake et al.
3,452,751 A 7/1969 Austin
3,525,118 A 8/1970 Viollet
3,698,641 A * 10/1972 Lonardo ..... B05B 1/005 239/434
3,918,676 A 11/1975 Carson
3,967,341 A * 7/1976 Gavin ..... A47L 5/14 15/345
4,055,870 A 11/1977 Furutsutsumi
4,232,487 A * 11/1980 Brown ..... B24C 5/02 451/88
4,300,318 A 11/1981 Brown
4,333,277 A 6/1982 Tasedan
4,670,062 A 6/1987 Lester
4,718,140 A 1/1988 Johnson
4,745,655 A 5/1988 Johnson
5,107,632 A 4/1992 Stern et al.
5,217,160 A 6/1993 Lopes
(Continued)

FOREIGN PATENT DOCUMENTS

DE 29816397 U1 12/1998

OTHER PUBLICATIONS

Supplementary Extended European Search Report for EP 14 737 806.1; dated Sep. 28, 2016; 6 pages.
(Continued)

*Primary Examiner* — Jeffrey R Jastrzab
(74) *Attorney, Agent, or Firm* — Barclay Damon LLP

(57) ABSTRACT

An air gun in combination with a vacuum source is powered by pressurized gas that is received through a gas inlet. The air gun and the vacuum source are configured to be simultaneously operable using the pressurized gas, which provides a method for conveniently air cleaning various objects.

7 Claims, 4 Drawing Sheets

(56) References Cited

U.S. PATENT DOCUMENTS

| | | | | |
|---|---|---|---|---|
| 5,924,166 | A | 7/1999 | Jones et al. | A47L 5/18 15/330 |
| 6,049,941 | A * | 4/2000 | Vollenweider, II | A47L 5/18 15/327.5 |
| 6,170,758 | B1 * | 1/2001 | Lee | A47L 5/18 239/124 |
| 6,434,783 | B1 | 8/2002 | Arnold et al. | |
| 6,516,819 | B1 * | 2/2003 | Pearson | B08B 5/02 134/166 R |
| 8,153,001 | B2 | 4/2012 | Peters | |

OTHER PUBLICATIONS

USPTO (ISA/US), International Search Report from PCT Appl. No. PCT/US2014/010032 completed Oct. 6, 2014 (total 4 pages).

* cited by examiner

AIR GUN SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The subject matter disclosed herein relates to a device that is powered by compressed gas and, in particular, to a portable device for ejecting gas that is used to clean objects.

BACKGROUND OF THE INVENTION

Various air driven devices for air cleaning industrial or electronic parts have been developed. Some of these devices use sand, or other forms of gritty material to air blast objects for cleaning purposes. Some equipment requires an overhanging tent to prevent grit from contaminating surrounding areas or must be used in a cabinet. Vacuum devices are commonly used to remove debris but cannot direct a stream of air toward a particular desired target for cleaning purposes. Other equipment that utilizes an air gun may adequately clean objects but can also disperse the removed dirt and other contaminants, such as oil, into the surrounding environment. Such dispersion requires cleanup at a later time or may pollute the environment where the equipment is used and cause airborne contaminants to be inhaled. Many such systems are electrically powered and, if they are used intermittently, require frequent turn off/on cycles, which can be inconvenient. To avoid constant turning on and off, they may be kept powered on when not actively in use which can lead to a noisy work environment.

It would be useful to develop an air gun cleaning system that can be used to direct an air stream toward articles of manufacture to remove dirt, debris, and oils from machined parts and other objects while simultaneously vacuuming (suctioning) away the contaminants. This background discussion is merely provided for general information and is not intended to be used in determining the scope of the claimed subject matter.

SUMMARY OF THE INVENTION

An air gun in combination with a vacuum source is powered by pressurized gas that is received through a gas inlet. The air gun and the vacuum source are configured to be simultaneously operable using the pressurized gas, which provides a method for conveniently air cleaning various objects. An advantage provided by such a system is that oil and debris can be forcefully blown off of manufactured parts and the oily mist and debris is simultaneously suctioned off into a waste container.

In one embodiment, an air gun in combination with a vacuum source is powered by pressurized gas that is received through a gas inlet. The air gun and the vacuum source are configured so as to be simultaneously activated using the pressurized gas.

In another embodiment, a method of operating an air pressure based cleaning system comprises connecting a tank of pressurized air to the system, and squeezing a trigger of an air gun which simultaneously opens an air channel from the tank to the air gun and from the tank to a vacuum source.

In another embodiment, an air gun system comprises an air gun and an air motor. A valve assembly is connected to the air gun via an air gun air tube and to the air motor by an air motor air tube. The valve assembly is configured to be connected to a source of pressurized air for diverting the pressurized air to the air gun through the air gun air tube and to the air motor through the air motor air tube for simultaneously activating the air gun and the air motor.

This brief description of the invention is intended only to provide a brief overview of subject matter disclosed herein according to one or more illustrative embodiments, and does not serve as a guide to interpreting the claims or to define or limit the scope of the invention, which is defined only by the appended claims.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

DETAILED DESCRIPTION OF THE INVENTION

Figure 1:
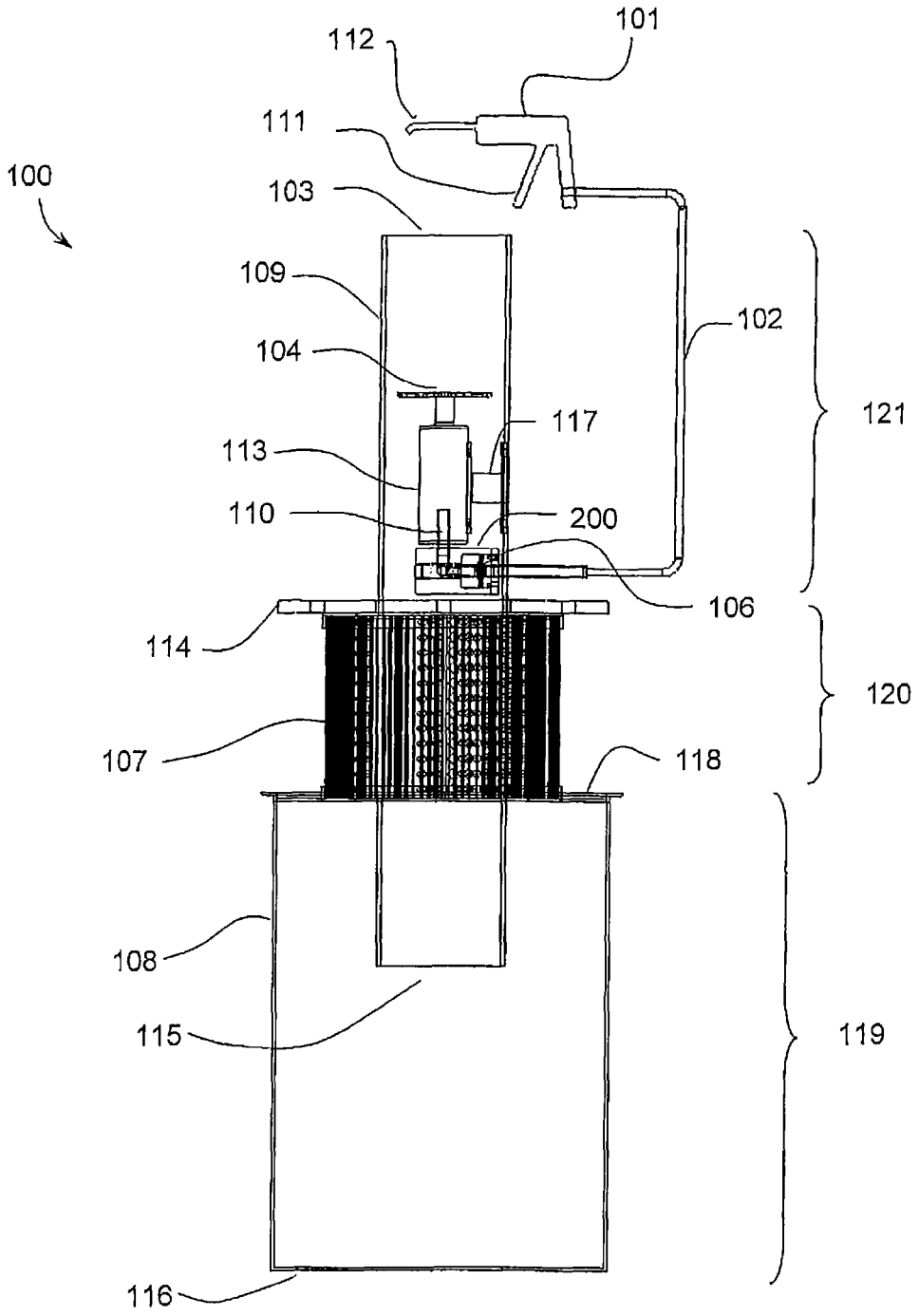
FIG. 1 is a perspective view of an exemplary air gun system.

FIG. 1 illustrates one embodiment of an air gun system 100. Briefly, the air gun system 100 includes an air gun 101 having a nozzle 112 for ejecting air and a trigger 111 for activating the air gun and the air gun system. Pressurized air enters the air gun through air gun air tube 102 which, in turn, is supplied through pressurized air tube 106 and is diverted to the air gun air tube 102 by the valve assembly 200. Pressurized air is also diverted to an air motor air tube 110, by the valve assembly, which activates air motor 113. The air motor drives a fan 104 which suctions air through the vacuum tube 109 from its top opening 103 through the bottom opening 115 into a waste container 108. An air filter 107 filters air that is exhausted from the vacuum tube. A more detailed description of the operation of the air gun system follows.

The air gun system includes an air gun 101 which may be used to activate, or open, the system by manually squeezing the air gun trigger 111. The trigger is connected to a valve (not shown) within the air gun which opens an air passage in the air gun (not shown), thereby activating the air gun system. Upon activation, the opened air passage allows pressurized air to be discharged from the nozzle 112 of the air gun. The pressurized air stream is sufficient to blow off debris from various objects placed in the path of the discharging air. The air passage in the air gun is connected to the nozzle and to a supply of pressurized air or other gas (not shown), via an air gun air tube 102 which may comprise a flexible tube such as a rubber or flexible plastic tube, a rigid tube such as a rigid plastic or metal tube, or a combination thereof. One embodiment of an air gun comprises ¼" Blow Gun made by Prevost Corp., P/N 27202OSH, (prevostusa.com). The supply of pressurized air (or other gas) may comprise a tank of finite size containing compressed air that is connected via a flexible or rigid tube to the pressurized air tube 106. Typically, such as in a work shop, pressurized air in the supply tank may be maintained at a pressure of about 40 psi to about 90 psi. It should be noted that the actual pressure may vary in a wide range and any mention herein of a range of pressures is not intended to limit embodiments included within the scope of the claimed subject matter.

When the trigger is released, a release mechanism (not shown), connected to the trigger and to the air passage valve within the air gun, biases the trigger to return to its initial resting position which closes the valve, thereby shutting off the air passage within the air gun and deactivating the air gun system. As will be used herein, the term "open state" refers to a state of the air gun system wherein the valve in the air gun is open, in response to the trigger being squeezed, and pressurized air flows through the air gun system from the pressurized air supply; while the term "closed state" refers to a state of the air gun system wherein the valve in the air gun is closed, in response to the trigger being released, and blocks the air passage in the air gun, thereby shutting down the flow of pressurized air through the air gun system, as will be described below. In one embodiment, squeezing and releasing the trigger causes the air gun system to alternate between the open (activated) and closed (deactivated) states, respectively. The terms "vacuum" and "suction", as used herein, are intended to be synonymous.

When the air gun system is activated, the air motor 113 also receives pressurized air via the air motor air tube 110, which may comprise a flexible tube such as a rubber or flexible plastic tube, a rigid tube such as a rigid plastic or metal tube, or a combination thereof. When so activated, the air motor rotates a fan 104 connected to the air motor and causes air to be drawn downward through the vacuum tube and creates suction at the vacuum tube top opening 103. Dirt, oil, dust, and various debris drawn by the suction at the vacuum tube opening travels downward through the vacuum tube past vacuum tube bottom opening 115 and into the waste container 108. Air filter 107 filters air exiting the vacuum tube that is driven downward by the fan. A screen may be fitted within the vacuum tube for preventing cleaned objects from being accidentally sucked into the waste container while allowing smaller debris and/or oil mist to pass therethrough into the waste container.

The vacuum tube itself is made of a rigid plastic or metal, or a combination thereof. The air motor is mounted to an inside surface (or wall) of the vacuum tube using an air motor mount 117, such as a suitable bracket, or other means, secured to the air motor and attached to the inside surface of the vacuum tube using, for example, screws. One embodiment of the air motor comprises a ¼" die grinder made by JET Tools (jettools.com), part No. JNS-7032. The air filter is a common cylindrical shaped canister filter that is attached to the top of the waste container cover 118 along the filter's bottom rim and to a bottom surface of support plate 114 along the filter's top rim. Both attachments should be sufficiently tight so as to eliminate gaps and prevent an undue amount of dust or debris exiting the vacuum tube from bypassing the filter. Pressurized air flows into the waste container through the bottom opening of the vacuum tube and flows out of the waste container through slots or openings in the waste container cover. These slots or openings are located in the waste container cover between the opening for the vacuum tube and the bottom rim of the air filter. Thus, the pressurized air exiting the waste container passes through the filter and any remaining dust or oil mist therein is trapped by the filter. Most of the suctioned debris, oil, dust, and other fragments fall into the waste container through the vacuum tube and remain there by force of gravity. [The arrows in FIG. 1 generally indicate this flow of pressurized air into and out of the waste container.]

The vacuum tube is attached to openings in the support plate and the waste container cover along an outer surface of the vacuum tube such that the vacuum tube extends into the waste container beyond the waste container cover for a short distance. The outer diameter of the vacuum tube matches the size of the openings in the support plate and the waste container cover through which it passes for easy attachment thereto, such as by brackets, press fit, plastic weld, or adhesives. In one embodiment, the vacuum tube and the waste container cover may be made from one piece of molded plastic, or the vacuum tube and the support plate may be made from one piece of molded plastic. These two attachment locations (support plate and waste container cover) along the outer surface of the vacuum tube serve to secure the vacuum tube in a vertical orientation when the bottom 116 of the waste container is placed on a floor, for example. Although the bottom of the vacuum tube is shown having a circular opening, the bottom of the vacuum tube may be cut at an angle.

Figure 2:
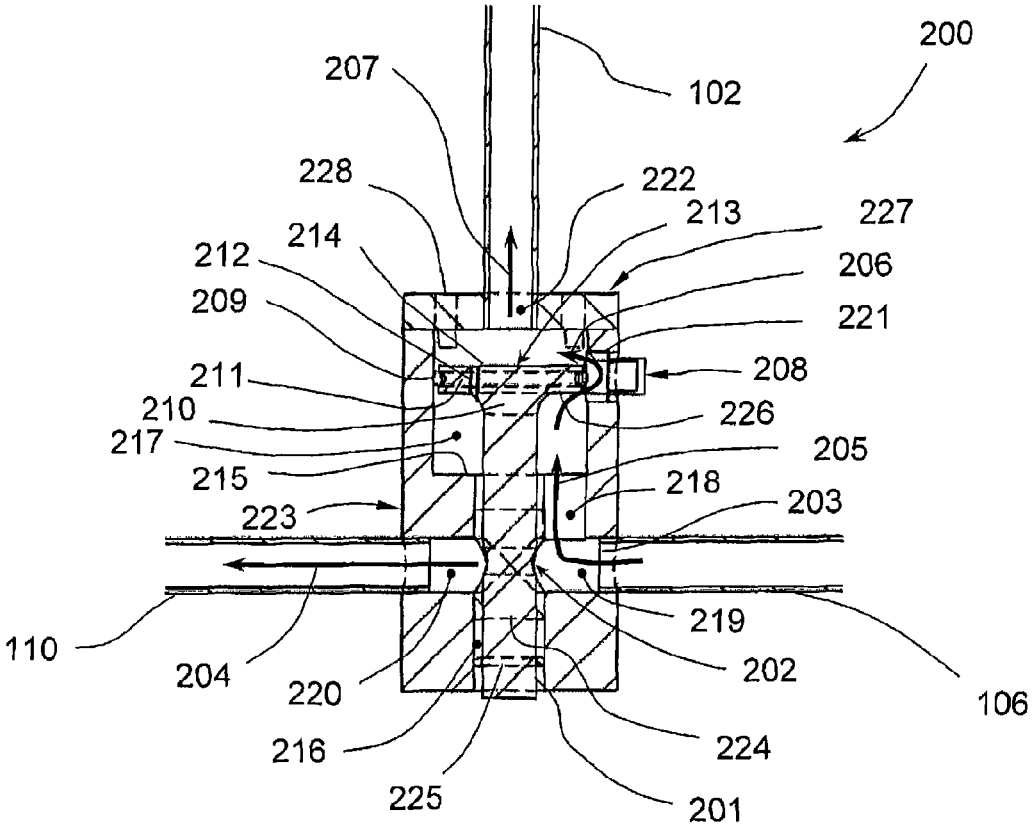
FIG. 2 is a cross-section of the valve assembly in an open state.
Figure 3:
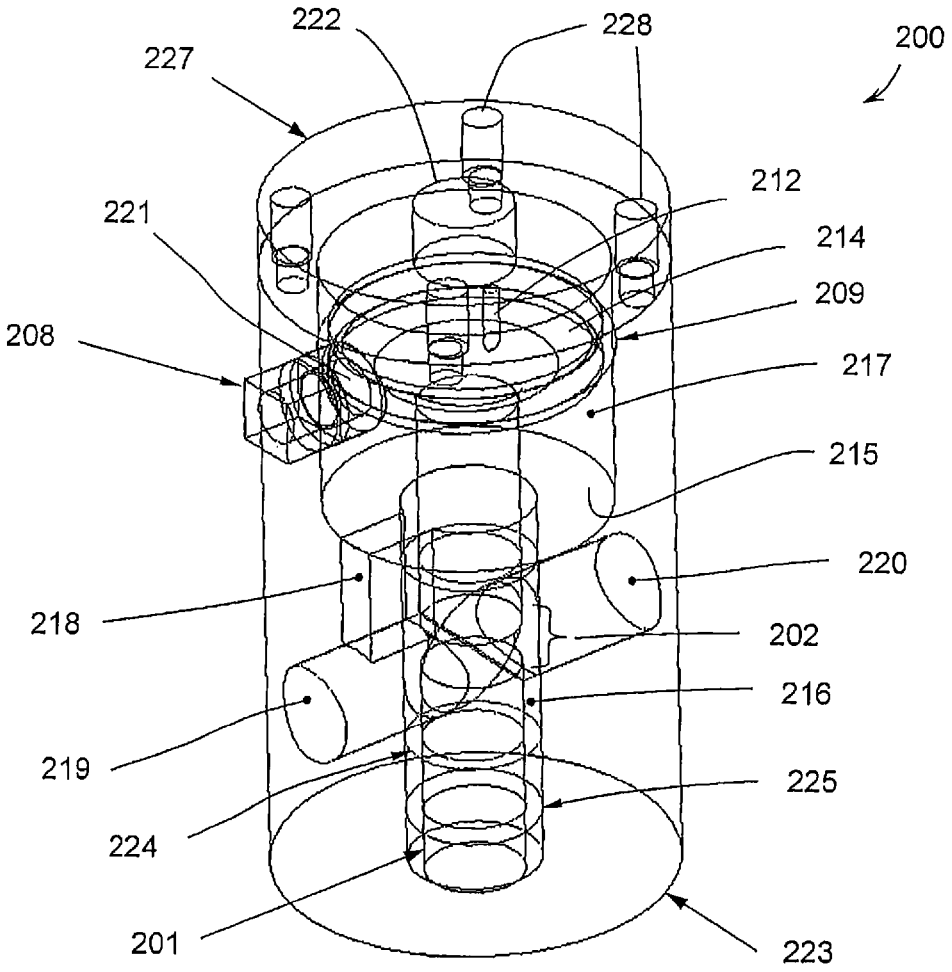
FIG. 3 is a transparent perspective view of the valve assembly.

With reference to FIG. 2 and FIG. 3 there is illustrated a valve assembly 200 in two views. FIG. 2 illustrates a cross section of the valve assembly while FIG. 3 illustrates a perspective transparent view of the valve assembly which may be helpful in visualizing the relative spatial relationships of the features of the valve assembly as described herein. The following detailed description can be referenced entirely in relationship to FIG. 2 alone. Thus, although not all the features of FIG. 2 are visible in FIG. 3, FIG. 3 can be referenced in the following detailed description as an aid to clarifying the shapes and spatial configurations of the various parts of the valve assembly.

The valve assembly 200 is connected to the pressurized air tube via the pressurized air inlet 219, the air motor air tube via the air motor outlet 220, and to the air gun air tube via air gun outlet 222. By operation of the valve assembly, when the air gun system is in the open state, pressurized air enters the air gun system via the pressurized air inlet and travels through the valve assembly to both the air motor air tube and to the air gun air tube. Thus, the pressurized air traveling to the air motor through the air motor air tube is also activated by squeezing the trigger. The valve assembly 200 comprises a cylinder shaped valve body 223, as seen from its exterior (FIG. 1), having three openings as follows: the pressurized air inlet, the air motor outlet, and the piston rod guide tube 216, all of which are sealed to their corresponding air tubes, and around the piston rod, with respect to the external atmosphere in a gas tight fashion. A fourth opening—the air gun outlet 222—passes through the valve cap 227, which is secured to the valve body in a gas tight fashion as described below, and the air gun outlet itself is also sealed in a gas tight fashion to the air gun air tube.

The pressurized air inlet is connected to receive pressurized air from the pressurized air tube, wherein the pressurized air tube extends into the pressurized air inlet of the valve body, as is illustrated by the terminal end 203 of the pressurized air tube within the pressurized air inlet, and is attached thereto by, for example, threading the inlet and the pressurized air tube and screwing them together. Similarly, the air motor outlet is connected to the air motor air tube, wherein the air motor air tube extends into the air motor outlet of the valve body, and is attached thereto by, for example, a similar threaded connection. Similarly, the air gun outlet in the valve cap is connected to the air gun air tube, wherein the air gun air tube extends into the air gun outlet of the valve cap 227, and is attached thereto by, for example, a similar threaded connection. The cylinder shaped valve body encloses a piston mechanism, as described below.

The valve assembly of FIG. 2 is illustrated in an open state of the air gun system, wherein pressurized air enters the valve assembly via the pressurized air inlet. The pressurized air travels through the pressurized air inlet in the valve body, travels upward, as seen in FIG. 2, indicated by arrow 205, through the valve interior air channel 218 formed in the valve body and extending from the pressurized air inlet to the piston chamber 217. The pressurized air then travels around piston 213 through a plug depression 221 on the inside surface of the piston chamber, as indicated by arrow 206, then through the air gun outlet and into the air gun air tube, as indicated by arrow 207, to the air gun.

Pressurized air that powers the air motor travels through the pressurized air tube from the supply of pressurized air, enters the valve body through the pressurized air inlet, travels through an opening in the bushing 224 facing the pressurized air inlet, and around the piston rod bevel 202, through another opening in the bushing facing the air motor outlet, and through the air motor outlet and into the air motor air tube, as indicated by arrow 204, to the air motor. The openings in the bushing substantially match the diameter of the pressurized air inlet and the air motor outlet. Thus, a vertical distance, from the perspective of FIG. 2, from the piston to the piston rod bevel substantially matches a vertical distance between the plug depression and the pressurized air inlet so that the pressurized air pathways indicated by arrows 204 and 206 are opened simultaneously.

Several other features of the valve assembly will now be described followed by further operational details of the valve assembly. The piston assembly comprises the piston, which has a circular contour as viewed from the top, matching the circular contour of the piston chamber (FIG. 5), and narrows to form a piston neck 210 and a piston rod portion 201. The piston assembly is typically formed as a single integrated structure such as by metal casting or it may be made of a suitable plastic. The piston assembly may also be formed in parts and attached together. For example, the piston rod may be screwed into the piston bottom surface. The piston includes an annular recess 211 around its perimeter wherein o-ring 209 is disposed. The piston assembly travels up and down, as viewed in FIG. 2, which movement is limited in the upward direction by the top face 214 of the piston traveling in the piston chamber and contacting the bottom of piston cap 227. Its downward movement is limited by the bottom face 226 of the piston contacting the bottom face 215 of the piston chamber. The o-ring in the perimeter of the piston contacts the interior surface of the piston chamber in a substantially gas tight fashion with or without movement by the piston therethrough. The piston rod travels through the piston rod guide tube 216 in an upward and downward fashion. The piston rod guide tube comprises a recess on its interior surface for receiving o-ring 225 which provides a gas tight seal against the piston rod with or without movement by the piston rod therethrough. The two o-rings, in the piston and in the piston rod guide tube, are typically made of rubber and are greased to ensure a gas tight fit and for lubricating movement of the piston assembly.

The plug depression is formed by an opening through the valve body being closed off by plug 208 and leaving a depression on the inside surface of the piston chamber sufficiently deep to provide an air gap to allow air to bypass the piston when the piston is positioned at the plug depression, as shown in FIG. 2. The plug 208 may be threaded, along with the plug opening, and screwed part of the way into the opening so as to form a depression on the inside surface of the piston chamber. The plug may also be permanently affixed, such as by welding, part of the way into the plug opening. In either case, the plug seals the opening in a gas tight fashion. The piston cap comprises four screw holes 228 through which four screws secure the piston cap to the valve body. A gasket or other sealant may be used between the valve cap and the valve body to ensure a gas tight seal. The piston comprises a bleed hole 212 that provides an air passage between the region in the piston chamber above the piston and the region below the piston. Thus, air pressure in the valve assembly tends to equalize on the top and bottom sides of the piston due to the free passage of air through the bleed hole.

As described above, the valve assembly of FIG. 2 is illustrated in an open state which allows pressurized air to travel through the valve assembly to both the air gun and the air motor. While in the open state the piston assembly remains in the position as illustrated in FIG. 2 at least partially due to the force of the air traveling around the piston rod bevel from the pressurized air inlet to the air motor outlet. As the piston rod moves upward or downward, from its position as shown in FIG. 2, the air gap provided by the piston rod bevel decreases and the movement of the pressurized air through the shrinking air gap tends to resist this movement when the system is in the open state, and so aids in stabilizing the piston assembly in a position wherein the air gap provided by the piston rod bevel is at a maximum size. If the piston rod bevel travels beyond the openings in the bushing (when the system is in the closed state, as shown in FIG. 4), the air passage from the pressurized air inlet to the air motor outlet becomes closed off by the larger diameter portion of the piston rod being positioned at the openings in the bushing.

Figure 4:
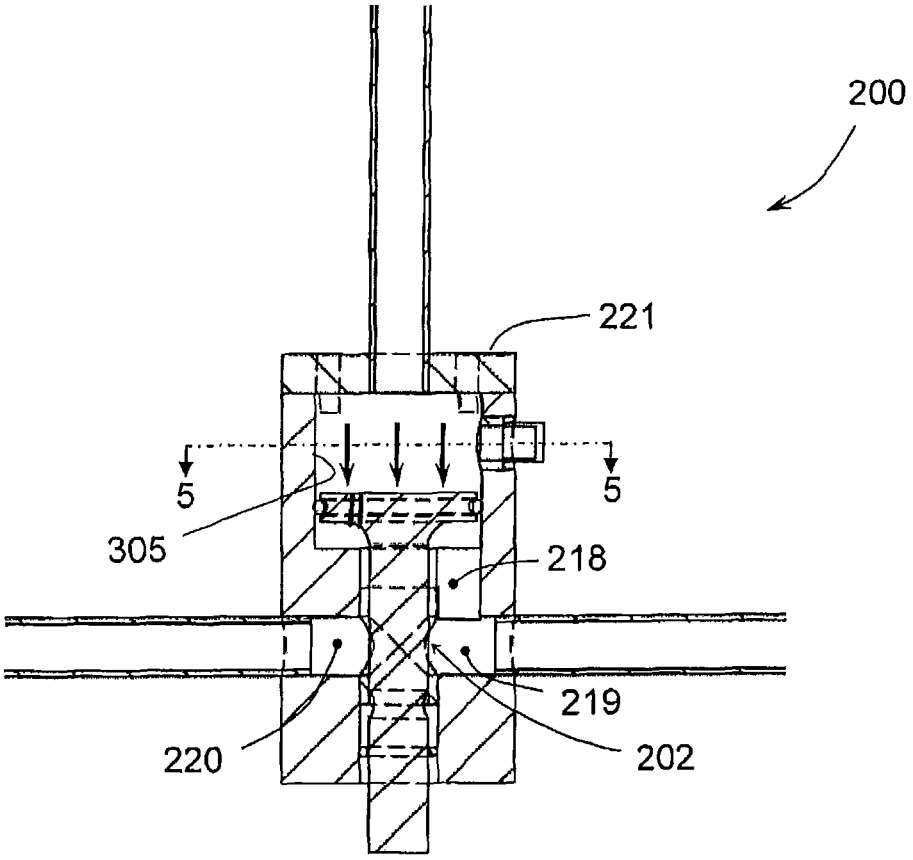
FIG. 4 is a cross-section of the valve assembly in a closed state.

When the trigger is manually released the system transitions from the open state, as shown in FIG. 2, to the closed state, as shown in FIG. 4, wherein the pressurized air stops flowing through the valve assembly, due to the closed air passage in the air gun. As pressurized air stops flowing through the air gun outlet, a rapid build-up of air pressure occurs within the valve assembly until it reaches a static air pressure level equal to the supply pressure of the air tank connected to the pressurized air inlet. In this state, the static air pressure in the piston chamber is equalized above and below the piston due to the bleed hole in the piston, as described above. Because the area of the entire top surface of the piston is subject to this static air pressure, which creates a downward force against the piston top surface, while a smaller area of the piston bottom surface is exposed to this same level of static air pressure, which creates a smaller upward force against the piston bottom surface, the downward force prevails and the piston assembly moves down. One reason that the piston bottom surface exposes a smaller area to the static air pressure is that part of the piston bottom surface comprises the piston neck, connected to the piston rod, and the bottom of the piston rod is not subject to this static air pressure because it protrudes from the valve body. Thus, the total downward force applied to the piston top surface, due to the pressurized air, is greater than the upward force applied to the piston bottom surface from the pressurized air.

With reference to FIG. 4, the valve assembly is illustrated in a closed state of the air gun system. Several elements of the valve assembly are not enumerated in FIG. 4 for purposes of clarity in the figure. The piston has been pushed downward, as explained above, to a position wherein the o-ring around the perimeter of the piston is circumferentially sealed in a gas tight fashion against the inside surface 305 of the piston chamber, and so the air travel pathway around the piston via the plug depression (206 of FIG. 2) is no longer accessible. The piston rod bevel has also been pushed downward and no longer provides an air gap between the pressurized air inlet and the air motor outlet which is the air pathway used by the pressurized air to power the air motor. Thus, the air gun and the air motor are de-activated and the air gun system remains in a closed state, as illustrated in FIG. 4, so long as the trigger remains in its released position.

When the trigger is again squeezed the valve in the air passage of the air gun opens and releases the air pressure built up in the piston chamber in the region above the piston, and causes the air gun system to transition from the closed state to the open state. This will rapidly reduce the prevailing downward force of the air pressure against the piston top surface, and so the pressurized air entering the piston chamber in the region below the piston through the pressurized air inlet and through the valve interior air channel pushes the piston upward to the open state of the air gun system as shown in FIG. 2. This stabilizes the piston assembly in that position so long as the trigger remains squeezed and the pressurized air supply provides pressurized air. The more rapid reduction of the downward force of the air pressure against the piston top surface, as compared to the upward force of the air pressure against the piston bottom surface, occurs because the rate of the air moving out of the piston chamber region above the piston and through the air gun outlet is greater than the rate of the air traveling through the bleed hole from the piston chamber region below the piston. The only exit path for pressurized air in the piston chamber region below the piston is through the bleed hole when the air gun system is transitioning from the closed state to the open state and before the piston reaches the plug depression during its upward movement.

With reference again to FIG. 1, exemplary dimensions of the air gun system are as follows. The waste container comprises a height 119 of approximately one and one-half feet; the air filter comprises a height 120 of approximately half of one foot; and the vacuum tube comprises a height 121 of approximately one foot above the air filter, resulting in an air gun system of approximately three feet in height. It should be noted that embodiments of the air gun system may vary in a wide range of sizes and shapes, and any mention herein of a lengths, widths, or other dimensions or shapes are exemplary only, and are not intended to limit embodiments included within the scope of the claimed subject matter.

Figure 5:
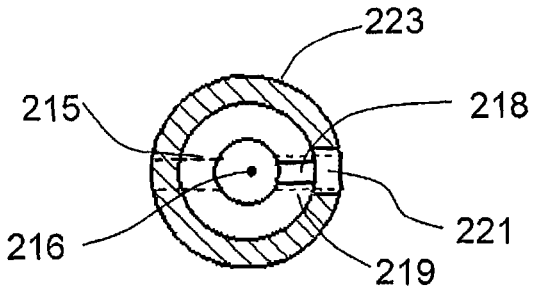
FIG. 5 is a top view of the valve body.

With reference to FIG. 5, there is illustrated a top view of the valve body 223 shown in cross section 5-5 as defined in FIG. 4. The piston assembly is removed in this figure as well as the plug for purposes of clarity in the figure. As shown, the pressurized air inlet 219, the valve's interior air channel 218, and the plug opening 221 are aligned in a vertical plane (from the perspective of FIG. 2). The pressurized air inlet enters the valve body and is in communication with the valve's interior air channel, which is slightly narrower than the pressurized air inlet and extends upward to the piston chamber bottom surface 215 and is in communication with the piston chamber 217. The piston rod guide tube 216, the piston chamber, and the exterior of the valve body are shown in a relatively concentric formation.

Advantages provided by the air gun system as described and illustrated herein include a portable cleaning system entirely powered by a pressurized air supply, which is useful for cleaning objects that may be damaged by liquid based cleaners, or where liquid based cleaning is unnecessary, inconvenient, or time inefficient. The air gun system becomes activated by squeezing the trigger of the air gun and is immediately usable and productive. The combination of a pressurized air stream and a vacuum source maintains a work space that is mostly free of debris, dust, and other contaminants. In a typical application, a user can hold in one hand an object, such as a manufactured part having debris and/or oil clinging thereto, above the vacuum tube opening while simultaneously holding the air gun in the other hand. Because both the vacuum and the pressurized air stream of the air gun system are activated and deactivated solely by the user squeezing and releasing the trigger in one hand, cleaning of various objects can be easily performed.

This written description uses examples to disclose the invention, including the best mode, and also to enable any person skilled in the art to practice the invention, including making and using any devices or systems and performing any incorporated methods. It will be understood that, although specific embodiments of the invention have been described herein for purposes of illustration and explained in detail with particular reference to certain preferred embodiments thereof, numerous modifications and all sorts of variations may be made and can be effected within the spirit of the invention and without departing from the scope of the invention. Accordingly, the scope of protection of this invention is limited only by the following claims and their equivalents.

PARTS LIST

100 air gun system
101 air gun
102 air gun air tube
103 vacuum tube top opening
104 fan
106 pressurized air tube
107 air filter
108 waste container
109 vacuum tube
110 air motor air tube
111 trigger
112 nozzle
113 air motor
114 support plate
115 vacuum tube bottom opening
116 waste container bottom surface
117 air motor mount
118 waste container cover

119 waste container height
120 filter height
121 vacuum tube height
200 valve assembly
201 piston rod
202 piston rod bevel
203 pressurized inlet tube end
204 air pathway
205 air pathway
206 air pathway
207 air pathway
208 plug
209 o-ring
210 piston neck
211 piston perimeter recess
212 bleed hole
213 piston
214 piston top surface
215 piston chamber bottom surface
216 piston rod guide tube
217 piston chamber
218 valve interior air channel
219 pressurized air inlet
220 air motor outlet
221 plug depression
222 air gun outlet
223 valve body
224 bushing
225 o-ring
226 piston bottom surface
227 valve cap
228 screw hole
305 inside surface of piston chamber

What is claimed is:

1. An air gun system comprising:

an air gun;

a vacuum source;

an air inlet configured to be connected to a source of pressurized air; [and]

*an air gun air tube for providing air traveling through the air inlet to the air gun; and* the air gun and the vacuum source both connected to the air inlet, wherein the air gun and the vacuum source are simultaneously operable using the pressurized air wherein the vacuum source comprises a fan for generating suction, the fan connected to an air motor configured to be driven by the pressurized air*, wherein the air gun comprises a nozzle and a trigger, the trigger for opening an air passage in the air gun for discharging the pressurized air through the nozzle when the trigger is squeezed and further comprising a valve assembly connected to the air gun air tube, the air motor air tube, and the air inlet, the valve assembly configured to allow pressurized air to travel from the air inlet to the air motor air tube and the air gun air tube when the valve assembly is in an open state and to block pressurized air from traveling from the air inlet to the air motor air tube when the valve assembly is in a closed state, the valve assembly alternating between the open and closed states in response to the trigger being squeezed and released*.

[2. The system of claim 1, wherein the air gun comprises a nozzle and a trigger, the trigger for opening an air passage in the air gun for discharging the pressurized air through the nozzle when the trigger is squeezed.]

[3. The system of claim 2, further comprising:

an air gun air tube for providing air traveling through the air inlet to the air gun; and an air motor air tube for providing air traveling through the air inlet to the air motor.]

[4. The system of claim 2, further comprising a valve assembly connected to the air gun air tube, the air motor air tube, and the air inlet, the valve assembly configured to allow pressurized air to travel from the air inlet to the air gun air tube and the air motor air tube when the valve assembly is in an open state and to block pressurized air from traveling from the air inlet to the air gun air tube and the air motor air tube when the valve assembly is in a closed state, the valve assembly alternating between the open and closed states in response to the trigger being squeezed and released.]

5. The system of claim [4] *1*, wherein the vacuum source and the air gun are simultaneously operable when the valve assembly is in the open state, and wherein the air gun further comprises a valve connected to the trigger, the valve opening the air passage when the trigger is squeezed.

6. The system of claim 5, wherein the valve assembly comprises a piston chamber having a moveable piston disposed therein, the piston comprising a piston top surface and a piston bottom surface, the piston dividing the piston chamber into an upper region above the piston top surface and a lower region below the piston bottom surface, the piston further comprising a bleed hole extending between the upper region and the lower region.

7. The system of claim 6, wherein the air gun air tube and the pressurized air tube are both in communication with the piston chamber.

8. The system of claim 7, wherein the valve assembly includes a valve body and the piston includes a piston rod extending from the piston bottom surface through a piston rod guide tube in the valve body, wherein a bottom surface of the piston rod is exposed to an air pressure external to the valve assembly.

9. The system of claim 8, wherein the valve assembly is configured such that the piston is positioned further from the piston rod guide tube when the valve assembly is in the open state than when the valve assembly is in the closed state.

10. The system of claim 8, wherein the valve assembly is configured such that a force exerted by the air in the piston chamber is greater on the piston top surface than on the piston bottom surface when the valve assembly is in the closed state.

* * * * *